(12) United States Patent
Ancarani

(10) Patent No.: US 8,061,503 B2
(45) Date of Patent: Nov. 22, 2011

(54) SYSTEM FOR CONVEYING FRUIT AND VEGETABLE PRODUCTS

(75) Inventor: Riccardo Ancarani, Alfonsine (IT)

(73) Assignee: Unitec S.p.A., Lugo (IT)

( * ) Notice: Subject to any disclaimer, the term of this patent is extended or adjusted under 35 U.S.C. 154(b) by 64 days.

(21) Appl. No.: 12/374,483

(22) PCT Filed: Jul. 20, 2007

(86) PCT No.: PCT/EP2007/057544
§ 371 (c)(1),
(2), (4) Date: Oct. 9, 2009

(87) PCT Pub. No.: WO2008/009752
PCT Pub. Date: Jan. 24, 2008

(65) Prior Publication Data
US 2010/0147651 A1 Jun. 17, 2010

(30) Foreign Application Priority Data
Jul. 21, 2006 (EP) .................................. 06425506

(51) Int. Cl.
*B65G 47/244* (2006.01)
(52) U.S. Cl. ................... 198/398; 198/415; 198/817
(58) Field of Classification Search ............ 198/389, 198/415, 817
See application file for complete search history.

(56) References Cited

U.S. PATENT DOCUMENTS

| | | | |
|---|---|---|---|
| 2,813,617 A | | 11/1957 | Sheetz |
| 3,695,371 A | * | 10/1972 | Sheetz .......................... 177/59 |
| 4,078,652 A | * | 3/1978 | MacFarland et al. ......... 198/443 |
| 4,747,480 A | * | 5/1988 | Wedler et al. ................. 198/396 |
| 4,783,794 A | * | 11/1988 | Dietrich .......................... 378/57 |
| 4,832,179 A | * | 5/1989 | Simmons .................... 198/461.3 |
| 5,058,749 A | * | 10/1991 | Jong ............................. 209/539 |
| 5,074,402 A | * | 12/1991 | Bender-Zanoni et al. . 198/626.1 |
| 5,314,056 A | * | 5/1994 | Davis et al. ................... 198/396 |
| 5,533,609 A | * | 7/1996 | Hulse ........................... 198/415 |
| 7,311,191 B2 | * | 12/2007 | Bahr ......................... 198/397.06 |
| 7,793,773 B2 | * | 9/2010 | Beck et al. .................... 198/584 |

FOREIGN PATENT DOCUMENTS

FR 2 725 704 A1 4/1996

OTHER PUBLICATIONS

PCT Notification of Transmittal of The International Search Report and the Written Opinion of the International Searching Authority or The Declaration for PCT Counterpart Application No. PCT/EP2007/057544 Containing International Search Report, 8 pgs (Oct. 30, 2007).

* cited by examiner

*Primary Examiner* — Douglas Hess
(74) *Attorney, Agent, or Firm* — Blakely, Sokoloff, Taylor & Zafman LLP.

(57) ABSTRACT

The system comprises a first conveyor and singularization line for fruit and vegetable products defined within a V-slot made in a body and presenting two first motorised belts installed on opposite walls which define the slot near the bottom of the slot and two motorised belts installed on each of said walls on a higher level than said first belts; said first belts presenting a different speed from that of said second belts.

8 Claims, 4 Drawing Sheets

SYSTEM FOR CONVEYING FRUIT AND VEGETABLE PRODUCTS

CROSS REFERENCE TO RELATED APPLICATIONS

This patent application is a U.S. National Phase application under 35 U.S.C. §371 of International Application No. PCT/EP2007/057544, filed on 20 Jul. 2007, entitled SYSTEM FOR CONVEYING FRUIT AND VEGETABLE PRODUCTS, which claims priority to European patent application number 06425506.0, filed 21 Jul. 2006.

TECHNICAL FIELD

The present invention relates to a system for conveying fruit and vegetable products, and in particular to a system adapted to singularize such products while they are conveyed.

BACKGROUND ART

The systems for conveying fruit and vegetable products comprise a loading station where a predetermined quantity of products is placed on a conveyor belt; a singularization station of the products where by reducing the width of a conveyor belt an attempt to align the products is made; a picking station where the features of the product, such as dimensions and colour, are inspected; and a packaging station of the products selected in the previous station. For certain small sized fruit and vegetable products provided with a footstalk, such as cherries and certain types of tomatoes, the products may not be aligned or one on top of the other along the conveyor belt installed in the singularization station. In such cases, human intervention is required, with inevitable production costs. Furthermore, the presence of the footstalk entails the possibility of the footstalk itself getting caught in clearances existing along the conveyor belt, thus upsetting product singularization.

DISCLOSURE OF INVENTION

It is the object of the present invention to provide a system for conveying fruit and vegetable products which is free from the above-mentioned drawbacks.

According to the present invention, a system for conveying fruit and vegetable products is made characterised in that it comprises a first conveyor and singularization line of said products defined within a V-slot made in a body and presenting two first motorised belts installed on opposite walls which define said slot near the bottom of said slot and two motorised belts installed on each of said walls on a higher level than said first belts; said first belts presenting a different speed from that of said second belts.

BRIEF DESCRIPTION OF THE DRAWINGS

The present invention will now be described with reference to the accompanying drawings illustrating a preferred embodiment thereof, in which.

DETAILED DESCRIPTION

Figure 1:
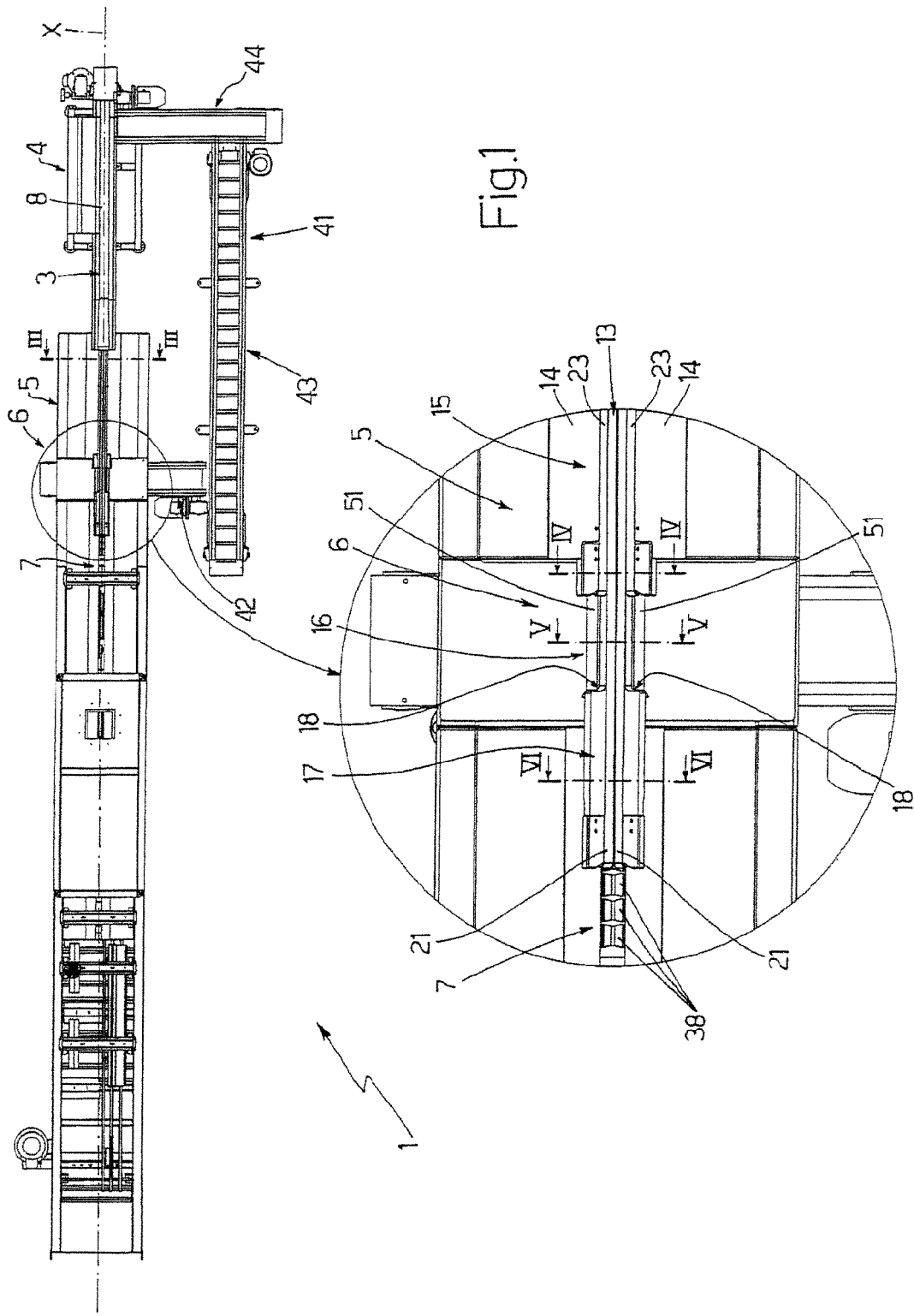
FIG. 1 is a plan view of a system made according to the dictates of the present invention.

With reference to FIG. 1, number 1 indicates as a whole a system adapted to convey fruit and vegetable products 2 comprising:

a first conveyor line 3 of products 2 along a horizontal axis X and installed at a loading station 4 where products 2 are introduced onto line 3;

a second conveyor line 5 defined along the aforesaid axis X and installed at a singularization station 6 of products 2; and a third line 7 defined along axis X and adapted to convey previously singularized products 2 towards a picking and packaging station (not shown).

The first conveyor line 3 presents a motorised conveyor belt 8 and presents a longitudinal end on a slightly higher level with respect to that of a first longitudinal end of conveyor line 5 so that products 2 fall from belt 8 onto line 5.

Figure 2:
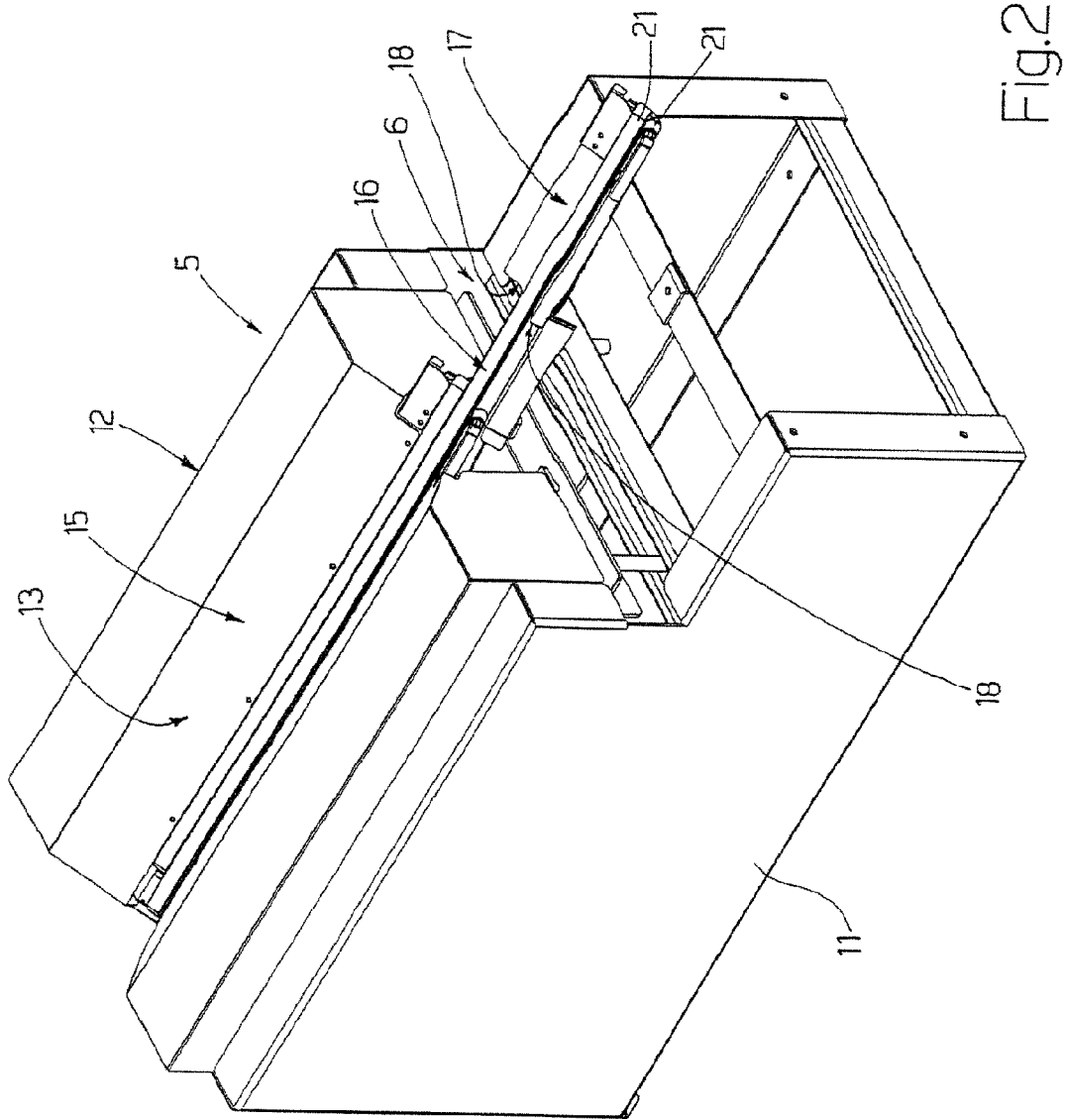
FIG. 2 is a perspective view of a part of the system in FIG. 1.

With reference to FIGS. 1 and 2, system 1, at conveyor line 5, comprises a base 11 which supports a body 12 on whose upper face a V-shaped slot 13 is defined. Body 12 is installed at aforesaid first longitudinal end of line 3 so that products 2 fall from line 3 into slot 13. The latter is defined by two walls 14 which lay on essentially and reciprocally orthogonal planes; the edge defined between walls 14 being coaxial to axis X. Body 12 presents, in sequence starting from the aforesaid first longitudinal end, a first segment 15 in which walls 14 present a certain surface extension, a second segment 16 in which walls 14 present a decidedly reduced surface extension with respect to the walls 14 of segment 15, and a third segment 17 in which walls 14 present an intermediate surface extension with respect to those of segment 15 and segment 16.

Figure 5:
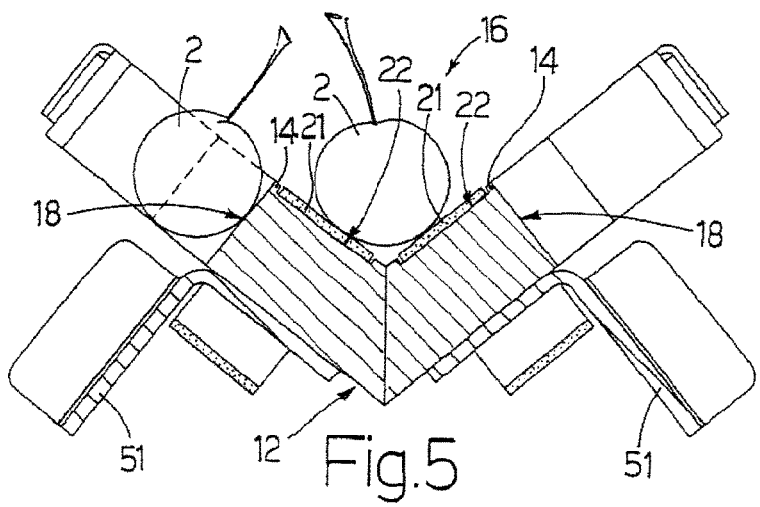
FIG. 5 is a partial section taken along line V-V in FIG. 1.
Figure 6:
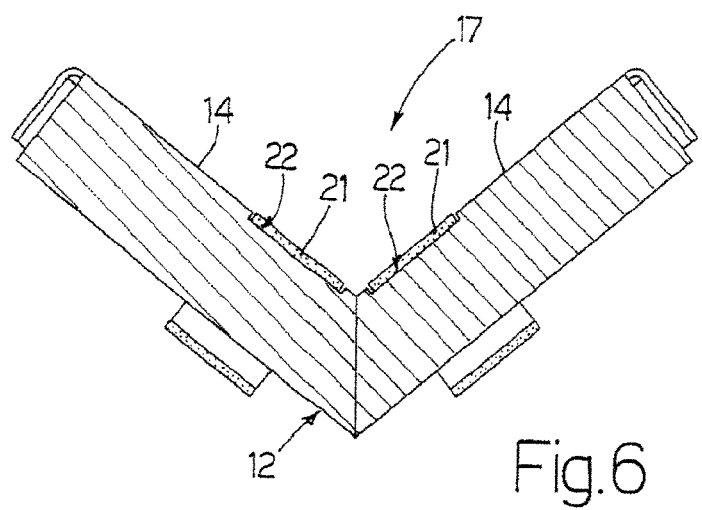
FIG. 6 is a partial section taken along line VI-VI in FIG. 1.

With reference to the accompanying figures, conveyor line 5 comprises two first motorised belts 21, one for each wall 14 and wound on the loop. Belts 21 present a visible upper part defined along a respective axis parallel to axis X and accommodated within a respective seat 22 (figures from 4 to 6) made in corresponding wall 14. In particular, the dimensions (thickness and width) of belt 21 are essentially equal to the depth and width of corresponding seat 22 so that the external face of belt 21 is coplanar to corresponding wall 14 and so that there is no clearance between the edges of belt 21 and the side walls of corresponding seat 22. Seats 22, and consequently belts 21, are near said edge defined between walls 14, and the distance between the central parts of belts 21 is essentially slightly higher than the width of product 2 so that there is only one product 2 between belts 21. Belts 21 extend for all segments 15, 16 and 17. Walls 14 at segment 16 present a surface extension slightly higher than that of belt 21, as shown in FIG. 5, so as to create two windows 18, one for each wall 14, at segment 16.

Figure 4:
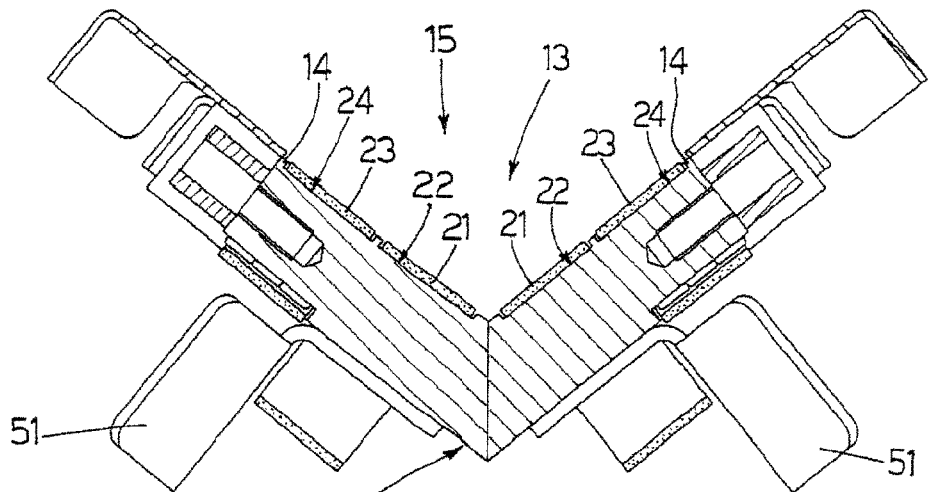
FIG. 4 is a partial section taken along line IV-IV in FIG. 1.

With reference to FIGS. 1, 2 and 4, conveyor line 5 comprises two second motorised belts 23, one for each wall 14 and wound on the loop. Belts 23 present a visible upper part defined along a respective axis parallel to axis X and accommodated within a respective seat 24 (FIG. 4) made in corresponding wall 14. In particular, the dimensions (thickness and width) of belt 23 are essentially equal to the depth and width of corresponding seat 24 so that the external face of belt 23 is coplanar to corresponding wall 14 and so that there is no clearance between the edges of belt 23 and the side walls of corresponding seat 24. Seats 24, and therefore belts 23, are on a slightly higher level than seats 22. Belts 23 extend only for segment 15.

Figure 3:
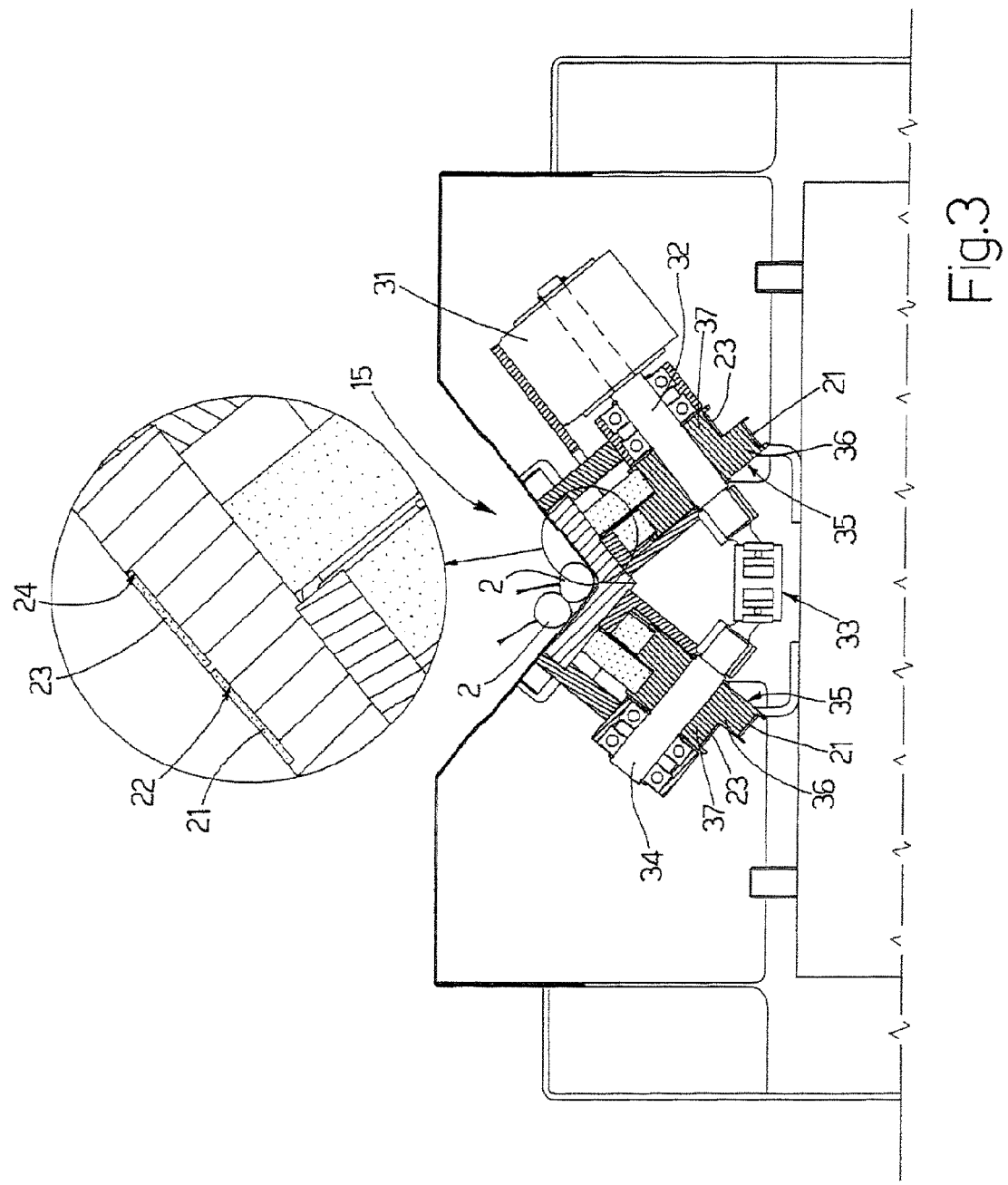
FIG. 3 is a section taken along line III-III in FIG. 1.

With reference to FIG. 3, conveyor line 5 is provided with an electrical motor 31 presenting an output shaft 32 with axis of rotation parallel to a first wall 14. Shaft 32, by means of joint 33 of the known type, transmits its motion to a revolving shaft 34 with axis of revolution parallel to the second wall 14. A respective gear 35 defined by two pulleys 36 and 37 is keyed onto shafts 32 and 34; pulley 36 being coupled to corresponding belt 21 and pulley 37 of diameter smaller than that of pulley 36 being coupled to corresponding belt 23. In a way not shown, each belt 21 and 23 is coupled to a corresponding idle pulley having such a diameter that belts 21 and 23 are at different speeds and in particular belts 21 present a speed higher than that of belts 23 during the operation of system 1.

With reference to FIG. 1, conveyor line 7 is on a slightly lower level than conveyor line 5 so that previously singularized products 2, as will be seen below, fall one at a time from line 5 onto conveyor line 7. The latter is provided with a belt defined by a plurality of rollers 38 with axis of revolution horizontal and orthogonal to axis X. Rollers 38 present a central concave part so that product 2 positions itself between two adjacent rollers 38. System 1 comprises a fourth conveyor line 41 with a U-shape plan presenting a first horizontal segment 42 arranged at and underneath windows 18 for collecting products 2 which fall from conveyor line 5, a second segment 43 presenting a first longitudinal end where products 2 transferred from segment 42 fall, and a third horizontal segment 44 presenting a first longitudinal end on a lower level than a second longitudinal end of segment 43 so that products 2 transferred from segment 43 fall onto segment 44 and a second longitudinal end arranged on a higher level than conveyor line 3 so that products 2 fall onto said line 3 from segment 44. At each window 18 a plate 51 is installed which constitutes a chute of product 2 from conveyor line 5 to segment 42 of conveyor line 41 underneath.

In use, products 2 are first introduced along conveyor line 3 which transfers them onto conveyor line 5. Given the shape of conveyor line 5, products 2 are normally arranged aligned with the bottom of body 13 exactly between belts 21. Some products 2 may be arranged on top of other products 2 underneath, as shown in FIG. 3. In this case, some products 2 are in contact with belts 21 while other products 2 are in contact with at least one belt 23. Due to the difference of speed between belts 21 and belts 23, products 2 in contact with belts 23 slide backwards. If despite this possibility of sliding, some products 2 remain on top of products 2 underneath, at segment 16 the products 2 in contact with belts 21 continue their stroke whereas the products 2 in contact with belts 23 find themselves at one of the windows 18, because the former are missing, and therefore fall towards segment 42 underneath onto conveyor line 41 which carries them back to conveyor line 3. Therefore, immediately after segment 16, products 2 transported by line 5 are singularized and may therefore be transferred to conveyor line 7.

From the above, the advantages obtained by implementing the present invention are apparent and numerous.

In particular, a system is made that rapidly, efficiently and above all with an effective saving of costs, singularizes fruit and vegetable products. This singularization of products is obtained not only by the different speed of belts 21 and 23 but also by eliminating the support to the top of the products which are on the bottom of body 12. Indeed, through windows 18, such products on top exit conveyor line 5 to return then to the loading station. It must be underlined that due to the dimensions of belts 21 and 23 and of respective seats and 24 described above, the co-planarity of the visible faces of belts 21 and 23 and of walls 14 is obtained by reducing clearances between belts 21 and 23 and respective seats 22 and 24. This prevents the products provided with footstalk from obstructing conveyor line 5.

It is finally apparent that changes and variants can be made to system 1 described and shown herein without however departing from the protective scope of the present invention.

What is claimed is:

1. A system for conveying fruit and vegetable products, said system comprising:
   a first conveyor and singularization line of said products defined within a V-slot made in a body;
   two first motorised belts installed on opposite walls which define said slot near the bottom of said slot; and
   two second motorised belts installed on each of said walls on a higher level than said first belts, said first belts presenting a different speed from that of said second belts.

2. The system according to claim 1, wherein said first belts present a higher speed than that of said second belts.

3. The system according to claim 1, wherein on said walls a respective sliding seat of said belts is made.

4. The system according to claim 3, wherein a visible face of said belts is essentially coplanar with the corresponding said wall.

5. The system according to claim 3, wherein the width of said belts is essentially equal to the width of the respective seat so as not to define clearances.

6. The system according to claim 1, wherein, along said first conveyor and singularization line, said body presents, in sequence, a first segment in which said walls present a certain surface extension so as to allow the installation of said first and second belts and a second segment in which said surfaces present a decidedly reduced surface extension with respect to that of said walls of said first segment so as to allow the installation only of said first belts and therefore define for each of said walls a respective window adapted to allow the exit of said first conveyor line of the products which in said first segment were possibly in contact with one of said second belts.

7. The system according to claim 6, wherein said system further comprises a second conveyor line installed in a loading station defined upstream of said first conveyor line and adapted to transfer to this said products and a third conveyor line adapted to collect said products from said first conveyor line at said windows and transfer said products towards said loading station.

8. The system according to claim 7, wherein said system further comprises a fourth conveyor line arranged in sequence to said first conveyor line and adapted to convey said products.

\* \* \* \* \*